United States Patent Office 3,113,108
Patented Dec. 3, 1963

3,113,108
LUBRICANT ADDITION AGENTS
Ellis K. Fields, Chicago, Ill., assignor to Standard Oil Company, Chicago, Ill., a corporation of Indiana
No Drawing. Original application Dec. 30, 1957, Ser. No. 705,755, now Patent No. 3,048,616, dated Aug. 7, 1962. Divided and this application Dec. 30, 1960, Ser. No. 79,910
12 Claims. (Cl. 252—51.5)

This invention relates to novel compositions of matter which are effective as viscosity index improvers and detergents in lubricant compositions. More particularly, the invention pertains to improved lubricant compositions containing the reaction products of tertiary alkyl azomethines with copolymers of dialkyl diesters of p-hydroxybenzal malonic acid.

Within recent years it has become common practice to impart improved properties to lubricants through the use of various types of additives or addition agents. Lubricating oils employed in internal combustion engines such as automotive and diesel engines require the use of one or more addition agents to improve their serviceability under certain adverse operating conditions. Among the more important additives employed are the type which function to prevent the formation and accumulation of sludge and varnish-like coatings on pistons and cylinder walls of the engine. Such additives which have the property of maintaining clean engines are referred to as "detergent-type" addition agents. Other addition agents in common usage are known as "viscosity index improvers." These additives function to improve the viscosity-temperature characteristics of the lubricant in which they are employed, said relationship commonly being expressed in the art as the viscosity index of the oil.

It is an object of this invention to provide novel reaction products of tertiary alkyl azomethines. Another object of this invention is to provide novel addition agents which when added to a lubricant will improve both the detergent properties and the viscosity index thereof. Still another object is to provide lubricant compositions possessing improved detergency and viscosity-temperature characteristics. Other objects and advantages of the invention will become apparent in the following description thereof.

The above objects, among others, are achieved in accordance with this invention by incorporating in a lubricating oil from about 0.01% to about 10% of an oil soluble addition agent which is the reaction product of from about 1% to about 40% by weight of (A) a tertiary alkyl azomethine, hereinafter defined, with about 99% to about 60% of (B) a copolymer of a dialkyl diester of p-hydroxybenzal malonic acid or a mixture of such diesters and an organic comonomer or mixture of comonomers capable of addition copolymerization, said copolymer having a molecular weight within the range from about 10,000 to about 125,000, and preferably within the range from about 20,000 to about 70,000, the mole ratio of said dialkyl diester to other comonomer or comonomers in said copolymer being within the range from about 1:100 and 1:1, and preferably from about 1:10 to about 1:2, said reaction being conducted at a temperature within the range from about 60° C. to about 200° C., and preferably from about 80° C. to about 140° C.

The azomethines which are useful in this invention have the general formula

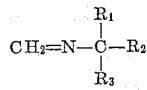

wherein $R_1$, $R_2$, and $R_3$ represent the same or different alkyl radicals, said azomethine having from 5 to about 30, and preferably from about 9 to about 16, carbon atoms in the molecule. Specific examples of azomethines included within this class and which are suitable for use in the invention are t-butyl azomethine, t-octyl azomethine, t-nonyl azomethine, t-dodecyl azomethine, t-octadecyl azomethine, t-tetracosyl azomethine and mixtures thereof. These azomethines, also known as aldimines, can readily be prepared in good yield by reacting formaldehyde with the desired t-alkyl amines, drying, and distilling as is described in U.S. Patent No. 2,582,-128, issued January 8, 1952, to Melvin D. Hurwitz.

The copolymer used as a reactant in forming the products of the present invention is a copolymer of a dialkyl diester of p-hydroxybenzal malonic acid or a mixture of such diesters and a comonomer or mixture of comonomers capable of addition copolymerization. The diesters are easily made by condensing p-hydroxybenzaldehyde with a diester of malonic acid. They have the general formula

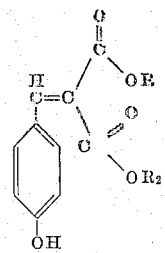

wherein $R_1$ and $R_2$ represent the same or different alkyl groups. For purposes of the invention the identity of the ester groups $R_1$ and $R_2$ is not important except insofar as it affects the ability of the dialkyl p-hydroxybenzal malonate to copolymerize with the comonomer (for example, because of possible steric hindrance). $R_1$ and $R_2$ may be straight or branched chain alkyl groups, suitably containing from 1 to about 20 carbon atoms and preferably from about 2 to about 6 carbon atoms. The ester groups may be the same or different, although from the standpoint of ease of preparation the diesters containing identical ester groups are to be preferred. Examples of suitable diesters of p-hydroxybenzalmalonic acid are the following: dimethyl, methylethyl, diethyl, methylpropyl, dipropyl, dihexyl, dioctyl, dioctadecyl, etc.

Dialkyl p-hydroxybenzal malonates can be copolymerized with other monomers by methods well known in the art. In general, the monomers which will copolymerize with the dialkyl p-hydroxybenzal malonates described above are characterized by having ethylenic unsaturation, that is, they contain a non-aromatic

group. The preferred monomers are those containing a terminal ethylenic group, i.e., a

group, wherein at least one of the valence bonds is linked to a negative group, and the other bond is linked to hydrogen or hydrocarbon groups. The preferred monomers may therefore be defined as vinylidene compounds (which term is intended to include vinyl compounds) wherein there is attached to the vinylidene group at least one negative group such as an aryl group (for example, as in styrene, alpha-methyl styrene, chlorinated styrenes, 3-methyl styrene, 3,4,5-trimethyl styrene, etc.); an acyloxy group (vinyl acetate, vinyl butyrate, vinyl decanoate, vinyl octadecanoate, etc.); an alkoxy group (vinyl butyl ether, vinyl octyl ether, vinyl decyl ether, vinyl octadecyl ether, etc.); an aroyloxy group (vinyl benzoate, vinyl toluate, etc.); an aryloxy group (vinyl phenyl ether, vinyl xylyl ethers, etc.); a carbalkoxy group (butyl acrylate, hexyl methacrylate, octyl acrylate, nonyl methacrylate, octadecyl acrylate, octadecyl methacrylate, etc.), etc. For use in preparing the lubricant additives of this invention, copolymers formed from comonomers containing only carbon and hydrogen atoms (for example, styrene and alkylated styrenes) or only carbon, hydrogen, and oxygen atoms (for example, unsubstituted vinyl esters and ethers) and dialkyl p-hydroxybenzal malonates are preferred.

The preferred monomers (i.e., vinylidene monomers) can be used in admixture with other monomers containing internal ethylenic unsaturation which do not readily homopolymerize but which will copolymerize with the dialkyl p-hydroxybenzal malonates and the vinylidene monomers. The preferred internally unsaturated compounds are esters of butenedioic acids having the general formula

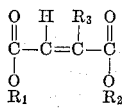

wherein $R_1$ and $R_2$ represent the same or different alkyl radicals having from about 4 to about 22 carbon atoms, and preferably from about 6 to about 12 carbon atoms, and $R_3$ is selected from the group consisting of hydrogen and a methyl radical. Examples of such internally unsaturated compounds are dibutyl fumarate, di-iso-octyl fumarate, dioctadecyl fumarate and the corresponding esters of maleic, citraconic and mesaconic acids.

The copolymers used in forming the products of this invention must be oil soluble. In order to achieve this end it is preferred that the comonomers used in forming copolymers with the dialkyl p-hydroxybenzal malonate each have from about 6 to about 30 carbon atoms, and preferably about 10 to about 24 carbon atoms in the molecule. In any given case oil solubility can readily be increased by adjusting the ratio of the reactants so as to increase the proportion of the more soluble monomer in the copolymer, for example the proportion of di-iso-octyl fumarate in a mixture of the same, styrene, and diethyl p-hydroxybenzal malonate, or by increasing the chain length of the substituent hydrocarbon groups, for example, the ester group when an acrylate or methacrylate is used or the side chain when an alkyl styrene is used. Suitable mole ratios of dialkyl p-hydroxybenzal malonates to other monomers in the copolymer range from about 1:100 to about 1:1, although since the malonates have only limited solubility in oil, it is preferable to use a substantial excess of an oil-soluble comoner, i.e., a malonate/comonomer mole ratio of about 1:10 to 1:2. When a mixture of vinylidene compounds and internally unsaturated compounds (e.g., butenedioic acid esters such as maleates or fumarates) is used, the mole ratio of the vinylidene compounds to the other monomers should be within the range from about 1:2 to about 4:1 and preferably from about 1:1 to about 2:1 in order to insure the formation of a copolymer.

The copolymerization can be carried out by any of the methods known to the art, i.e. in bulk, in solution or in emulsion. Bulk and solution polymerization are preferred, however. A particularly useful expedient is solution polymerization in which the solvent is a lubricating oil similar to that in which the additive is to be used, e.g., an SAE 10 to SAE 30 base oil when the additive is to be used in an automotive crank-case oil. The reaction with azomethine can then be carried out with the copolymer in solution, resulting in a concentrate of the final reaction product in oil solution which requires no purification and which is easily handled and dispensed.

In preparing the copolymers used in this invention there can be employed as a catalyst any compound which is capable of providing stable free radicals under the conditions of the reaction. Examples of such catalysts are peroxy compounds, for example, organic peroxides, peroxy salts, hydroperoxides, etc., such as t-butyl peroxide, acetyl peroxide, cumene hydroperoxide, t-butyl hydroperoxide, ethyl peroxy carbonate, and the like, and azo compounds such as $\alpha,\alpha'$-azodiisobutyronitrile, dimethyl and diethyl $\alpha,\alpha'$-azodiisobutyrate, etc. Such initiators can be used in a concentration of about 0.001% to 0.5% by weight. In addition, polymerization may also be initiated by the use of ultra-violet light as well as by the use of heat alone.

In general, the range of polymerization reaction temperatures employed in producing the copolymers varies between about 80° C. and 170° C. and is preferably within the range from about 100° C. to about 140° C. It will be understood that the polymerization temperature selected will usually be varied according to the nature and amount of the particular monomers and catalysts, if any, used, the desired polymerization pressure and the molecular weight of the product which are desired. Likewise the time for polymerization will be dependent on similar factors and can range over a period from about 1 hour to about 72 hours, as will be apparent to one skilled in the art.

The copolymers are reacted with the azomethine in accordance with the invention by heating a mixture of the reactants, optionally in the presence of an inert diluent or solvent such as a petroleum lubricating oil fraction, at a temperature within the range from about 60° C. to about 200° C., and preferably from about 80° to about 140° C., for a period of time from about 1 to about 20 hours, and preferably from about 2 to about 10 hours. The reactants are used in such proportions that the azomethine constitutes from about 1% to about 40%, and preferably from about 2% to about 25%, of the combined weight of the azomethine and copolymer used. At the end of the reaction period any excess, unreacted azomethine can easily be removed by blowing with nitrogen until the characteristic azomethine odor disappears.

The following examples are illustrative of my invention, and are not intended to be limiting.

EXAMPLE 1

The preparation of the copolymers used in accordance with the invention is illustrated by the following: A mixture of 3.5 g. diethyl p-hydroxybenzal malonate, 10 g. styrene, and 50 g. n-lauryl methacrylate plus 0.1 ml. t-butyl hydroperoxide was heated at 100° C. for 24 hours and at 125° C. for 24 hours. The viscous red copolymer resulting had a specific viscosity, 1% solution in toluene at 20° C., of 0.247.

EXAMPLE 2

The preparation of the tertiary alkyl azomethines used in this invention is illustrated by the preparation of t-octyl azomethine, as follows: To 258 grams (2.0 mols) of t-octyl amine in a one liter flask equipped with a stirrer was added 168 grams (2.05 mols) of 36.6% aqueous formaldehyde with stirring. The temperature was maintained below 40° C. by external cooling. The mixture was cooled to 25° C. and 10 grams of potassium hydroxide was added to aid in the separation of water. The organic layer was separated, dried over KOH, filtered and distilled, giving 231.5 grams (82% yield) of t-octyl azomethine boiling at 147–151° C. at atmospheric pressure.

In a similar manner the other tertiary alkyl azomethines used in the following examples were prepared using the corresponding tertiary alkyl amines and formaldehyde as the reactants.

EXAMPLE 3

A mixture of 30 g. copolymer of Example 1 and 1.22 g. Primene 81–R azomethine (prepared from formaldehyde and Primene 81–R, a commercial product of Rohm and Haas Co. which is a mixture of tertiary amines consisting principally of t-$C_{12}H_{25}NH_2$ to t-$C_{15}H_{31}NH_2$, neutral equivalent 191, boiling range 223–240° C., sp. gr. 0.812 and $n_D^{20}$ 1.423) was heated at 104° C. for 2 hours. The resulting product contained 0.297% N; a 1% solution in toluene had a specific viscosity (20° C.) of 0.21.

EXAMPLE 4

A mixture of 30 g. copolymer of Example 1 and 0.846 g. t-octyl azomethine was heated at 104° C. for 2 hours, giving a product containing 0.173% N. A 1% solution in toluene had a specific viscosity (20° C.) of 0.23.

EXAMPLE 5

A mixture of 5 ml. diethyl p-hydroxybenzal malonate, 18 ml. styrene, 27 ml. di-iso-octyl fumarate plus 0.2 ml. t-butyl hydroperoxide was heated at 100° C. for 16 hours and at 134° C. for 24 hours, giving a very viscous, red copolymer.

EXAMPLE 6

A mixture of 25 ml. copolymer of Example 5 and 2 ml. Primene 81–R azomethine was heated at 110° C. for 24 hours, giving a product containing 0.689% N. All azomethine odor had disappeared. A 1% solution in toluene had a specific viscosity (20° C.) of 0.125.

EXAMPLE 7

A mixture of 25 ml. copolymer of Example 5 and 2 ml. t-octyl azomethine was heated at 110° C. for 24 hours, giving a product containing 0.807% N. with no trace of azomethine odor. A 1% solution in toluene had a specific viscosity (20° C.) of 0.125.

The reaction products of the above examples were tested for their effectiveness as viscosity index improvers at a concentration of 2% by weight in a solvent extracted SAE 5 base oil. The results are given in the following table.

*Table I*

| Additive: * | Viscosity index |
|---|---|
| None | 90 |
| Product of Example 3 | 138 |
| Product of Example 4 | 139 |
| Product of Example 6 | 130 |
| Product of Example 7 | 126 |

* 2% in SAE 5 base oil.

The effectiveness of the products of the present invention in improving the detergency characteristics of lubricating oils is demonstrated by the data in Table II. These data were obtained by subjecting a hydrocarbon oil with and without the products of the above Examples to the detergency and oxidation test known as the squalene Indiana Stirring Oxidation Test (I.S.O.T.) and to the carbon suspension test (C. B. Biswell et al., Ind. Eng. Chem. 47, 1598, 1601 (1955)). In the squalene I.S.O.T. 10% by weight of squalene (a highly unsaturated reactive hydrocarbon that polymerizes easily and forms a tightly adhering varnish during the test) is added to the oil to be tested and the mixture is heated at 300° F. in a 500 cc. glass beaker in the presence of 5 square in. of copper and 10 square in. of iron. Four glass rods of 6 mm. diameter are suspended in the oil which is stirred at about 1300 r.p.m. by means of a glass stirrer. After 72 hours the test is ended and varnish values are determined. Varnish values or ratings are based upon visual inspection of the glass rods, in which a rod free of any varnish deposit is given a rating of 10 while a badly coated rod is given a rating of 1. Rods having appearances between these extremes are given intermediate values. The products of this invention were tested at 2% by weight concentration in a solvent extracted SAE 30 base oil containing 0.75% of sulfurized dipentene. In the carbon suspension test the products were tested at 0.5% concentration in 70 cc. kerosene with three grams of a paste containing 20% carbon black in a heavy white oil base, stirring the mixture five minutes in a 100 cc. graduate in a Herschel demulsibility tester at room temperature (25° C.). After 5 days (120 hours) the percentage of carbon black which had settled out was recorded.

*Table II*

| Product | Charcoal Suspension Test: Percent Charcoal Settled After 120 Hours | Squalene ISOT: Varnish Rating |
|---|---|---|
| None | 90 (in 4 hours) | 5 |
| Example 1 | 90 (in 72 hours) | |
| Example 3 | 0 | 10 |
| Example 4 | 0 | 9 |
| Example 6 | 0 | 9 |
| Example 7 | 0 | 9 |

It can be seen from the above data that the novel products of my invention are effective both as viscosity index improvers and detergents in oils. By contrast, a comparison in Table II of the product of Example 1 with those of Examples 3 and 4 shows that copolymers of dialkyl p-hydroxybenzal malonates prior to reaction with azomethine (Example 1) possess no detergent properties whatsoever.

The products of this invention can be used in lubricating oils in concentrations of from about 0.01% to about 10% and preferably from about 0.5% to about 5% by weight. Although the present invention has been illustrated by the use of these products in mineral lubricating oils it is not restricted thereto. Other lubricating oil bases can be used, such as hydrocarbon oils, both natural and synthetic, for example, those obtained by the polymerization of olefins, as well as synthetic lubricating oils of the alkylene oxide type and the polycarboxylic acid ester type, such as the oil soluble esters of adipic acid, sebacic acid, azelaic acid, etc. It is also contemplated that various other well known additives, such as antioxidants, anti-foaming agents, pour point depressors, extreme pressure agents, antiwear agents, etc., may be incorporated in lubricating oils containing the additives of my invention.

Concentrates of a suitable oil base containing more than 10%, for example up to 50% or more, of the copolymers of this invention alone or in combination with other additives can be used for blending with hydrocarbon oils or other oils in the proportions desired for the particular conditions of use to give a finished product containing from about 0.01% to about 10% of the reaction products of this invention.

Unless otherwise stated, the percentages given herein and in the claims are percentages by weight.

While I have described my invention by reference to specific embodiments thereof, the same are given by way of illustration only. Modifications and variations will be apparent from my description to those skilled in the art.

This application is a division of my application S.N. 705,755, now Patent No. 3,048,616.

Having described my invention, I claim:

1. A lubricant composition comprising a major proportion of a hydrocarbon lubrication oil and a minor proportion, sufficient to improve the detergent qualities and viscosity index of said composition, of an oil-soluble product obtained by reacting, at a temperature in the range of from about 60° C. to about 200° C., from about 1% to about 40% by weight of tertiary alkyl azomethine having from 5 to about 30 carbon atoms and having the formula:

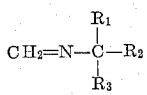

wherein $R_1$, $R_2$ and $R_3$ are alkyl, and from about 60% to about 99% by weight of a malonate containing copolymer having a molecular weight within the range of from about 10,000 to about 125,000 said malonate containing copolymer being prepared by the copolymerization at a temperature in the range of 80° C. to 170° C. of dialkyl p-hydroxybenzal malonate and a substituted-hydrocarbon comonomer and having a mole ratio of malonate:substituted-hydrocarbon comonomer in the range of from about 1:100 to about 1:1, said dialkyl p-hydroxybenzal malonate containing from 1 to about 20 carbon atoms in each ester group and said substituted-hydrocarbon comonomer having terminal ethylenic unsaturation and from 6 to 30 carbon atoms and having as the substituent a negative group selected from the class consisting of aryl, acyloxy, alkoxy, aroyloxy, aryloxy and carbalkoxy, said substituent being bonded to the unsaturated carbon of said terminal ethylenic unsaturation.

2. A lubricant composition comprising a major proportion of a hydrocarbon lubricating oil and from about 0.01% to about 10% by weight of an oil-soluble product obtained by reacting, at a temperature in the range of from about 60° C. to about 200° C., from about 1% to about 40% by weight of tertiary alkyl azomethine having from 9 to about 16 carbon atoms and having the formula:

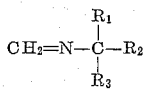

wherein $R_1$, $R_2$ and $R_3$ are alkyl, and from about 60% to about 99% by weight of a malonate containing copolymer having a molecular weight within the range of from about 10,000 to about 125,000 said malonate containing copolymer being prepared by the copolymerization at a temperature in the range of 80° C. to 170° C. of dialkyl p-hydroxybenzal malonate and a substituted-hydrocarbon comonomer and having a mole ratio of malonate:substituted-hydrocarbon comonomer in the range of from about 1:100 to about 1:1, said malonate containing from 1 to about 20 carbon atoms in each ester group and said substituted-hydrocarbon comonomer having terminal ethylenic unsaturation and from 10 to 24 carbon atoms and having as the substituent a negative group selected from the class consisting of aryl, acyloxy, alkoxy, aroyloxy, aryloxy and carbalkoxy, said substituent being bonded to the unsaturated carbon of said terminal ethylenic unsaturation.

3. A lubricant composition comprising a major proportion of a hydrocarbon lubricating oil and from about 0.01% to about 10% by weight of the oil-soluble reaction product defined in claim 2, wherein said azomethine is t-octyl azomethine.

4. A lubricant composition comprising a major proportion of a hydrocarbon lubricating oil and from about 0.01% to about 10% by weight of an oil-soluble product obtained by reacting, at a temperature in the range of from about 60° C. to about 200° C., from about 1% to about 40% by weight of tertiary alkyl azomethine having from 9 to about 16 carbon atoms and having the formula:

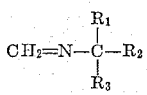

wherein $R_1$, $R_2$ and $R_3$ are alkyl, and from about 60% to about 99% by weight of a malonate containing copolymer having a molecular weight within the range of from about 10,000 to about 125,000 said malonate containing copolymer being prepared by the copolymerization at a temperature in the range of 80° C. to 170° C. of diethyl p-hydroxybenzal malonate and a substituted-hydrocarbon comonomer and having a mole ratio of malonate:substituted-hydrocarbon comonomer in the range of from about 1:100 to about 1:1, said substituted-hydrocarbon comonomer having terminal ethylenic unsaturation and from 10 to 24 carbon atoms and having as the substituent a negative group selected from the class consisting of aryl, acyloxy, alkoxy, aroyloxy, aryloxy and carbalkoxy, said substituent being bonded to the unsaturated carbon of said terminal ethylenic unsaturation.

5. A lubricant composition comprising a major proportion of a hydrocarbon lubricating oil and from about 0.01% to about 10% by weight of an oil-soluble product obtained by reacting, at a temperature in the range of from about 60° C. to about 200° C., from about 1% to about 40% by weight of tertiary alkyl azomethine having from 9 to about 16 carbon atoms and having the formula:

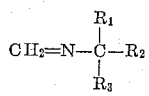

wherein $R_1$, $R_2$ and $R_3$ are alkyl, and from about 60% to about 99% by weight of a malonate containing copolymer having a molecular weight within the range of from about 10,000 to about 125,000 said malonate containing copolymer being prepared by the copolymerization at a temperature in the range of 80° C. to 170° C. of dialkyl p-hydroxybenzal malonate, a substituted-hydrocarbon comonomer, and a diester of butenedioic acid, and having a mole ratio of malonate:substituted-hydrocarbon comonomer in the range of from about 1:100 to about 1:1, said malonate containing from 1 to about 20 carbon atoms in each ester group and said substituted-hydrocarbon comonomer having terminal ethylenic unsaturation and from 10 to 24 carbon atoms and having as the substituent a negative group selected from the class consisting of aryl, acyloxy, alkoxy, aroyloxy, aryloxy and carbalkoxy, said substituent being bonded to the unsaturated carbon of said terminal ethylenic unsaturation, said diester of butenedioic acid having the formula:

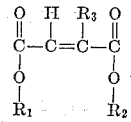

wherein $R_1$ and $R_2$ represent alkyl having from about 4 to about 22 carbon atoms and $R_3$ is selected from the class consisting of hydrogen and methyl, the mole ratio of said substituted-hydrocarbon comonomer to said diester being within the range of from about 1:2 to about 4:1, said copolymer being formed by said copolymerization with said diester in admixture with said malonate and said substituted-hydrocarbon comonomer at said copolymerization temperature.

6. An addition agent concentrate for lubricating oils, consisting essentially of a hydrocarbon oil and more than 10% by weight of an oil-soluble product obtained by reacting, at a temperature in the range of from about 60° C. to about 200° C., from about 1% to about 40% by weight of tertiary alkyl azomethine having from 9 to about 16 carbon atoms and having the formula:

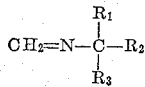

wherein $R_1$, $R_2$ and $R_3$ are alkyl, and from about 60% to about 99% by weight of a malonate containing copolymer having a molecular weight within the range of from about 10,000 to about 125,000 said malonate containing copolymer being prepared by the copolymerization at a temperature in the range of 80° C. to 170° C. of dialkyl p-hydroxybenzal malonate and a substituted-hydrocarbon comonomer and having a mole ratio of malonate:substituted-hydrocarbon comonomer in the range of from about 1:100 to about 1:1, said malonate containing from 1 to about 20 carbon atoms in each ester group and said substituted-hydrocarbon comonomer having terminal ethylenic unsaturation and from 10 to 24 carbon atoms and having as the substituent a negative group selected from the class consisting of aryl, acyloxy, alkoxy, aroyloxy, aryloxy and carbalkoxy, said substituent being bonded to the unsaturated carbon of said terminal ethylenic unsaturation, said concentrate being capable of dilution with a lubricating oil to form a homogeneous mixture containing from about 0.01% to about 10% by weight of said product.

7. A lubricant composition comprising a major proportion of a hydrocarbon lubricating oil and from about 0.01% to about 10% by weight of the oil-soluble reaction product defined in claim 2 wherein said comonomer is n-lauryl methacrylate.

8. A lubricant composition comprising a major proportion of a mineral lubricating oil containing from about 0.5% to about 5% by weight of the oil-soluble reaction product defined in claim 5, wherein said butenedioic acid diester is a diester of fumaric acid.

9. A lubricant composition comprising a major proportion of a mineral lubricating oil containing from about 0.5% to about 5% by weight of the oil-soluble reaction product defined in claim 5, wherein said butenedioic acid diester is diiso-octyl fumarate.

10. A lubricant composition comprising a major proportion of a mineral lubricating oil containing from about 0.5% to about 5% by weight of the oil-soluble reaction product defined in claim 5, wherein said substituted hydrocarbon comonomer is styrene.

11. A lubricant composition comprising a major proportion of a mineral lubricating oil containing from about 0.5% to about 5% by weight of the oil-soluble reaction product defined in claim 5, wherein said azomethine is t-octyl azomethine.

12. A lubricant composition comprising a major proportion of a mineral lubricating oil containing from about 0.5% to about 5% by weight of the oil-soluble reaction product defined in claim 5, wherein said azomethine is t-octyl azomethine, said dialkyl p-hydroxybenzal malonate is diethyl p-hydroxybenzal malonate, said comonomer is styrene, and said butenedioic acid diester is diisooctyl fumarate, said copolymer having a molecular weight from about 20,000 to about 70,000.

References Cited in the file of this patent
UNITED STATES PATENTS

| | | |
|---|---|---|
| 2,698,316 | Giammaria | Dec. 28, 1954 |
| 2,728,751 | Catlin et al. | Dec. 27, 1955 |
| 2,810,744 | Popkin | Oct. 22, 1957 |
| 2,984,654 | Agius et al. | May 16, 1961 |